(12) United States Patent
Ylitalo et al.

(10) Patent No.: US 6,386,699 B1
(45) Date of Patent: May 14, 2002

(54) EMBOSSED RECEPTOR MEDIA

(75) Inventors: Caroline M. Ylitalo, Stillwater; Lori P. Engle, Little Canada; Verna J. LeMire, White Bear Lake; Patrick R. Fleming, Oakdale, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/713,610

(22) Filed: Nov. 15, 2000

Related U.S. Application Data

(62) Division of application No. 09/069,665, filed on Apr. 29, 1998, now abandoned.

(51) Int. Cl.$^7$ .................................................. B41J 2/01
(52) U.S. Cl. ........................ 347/105; 347/106; 347/107; 428/195
(58) Field of Search .......................... 428/195; 347/105, 347/106, 107

(56) References Cited

U.S. PATENT DOCUMENTS

| | | | |
|---|---|---|---|
| 3,957,724 A | 5/1976 | Schurb et al. | 260/46.5 E |
| 3,997,702 A | 12/1976 | Schurb et al. | 428/352 |
| 4,145,112 A | 3/1979 | Crone et al. | 350/103 |
| 4,313,988 A | 2/1982 | Koshar | 428/40 |
| 4,379,804 A | 4/1983 | Eisele | 428/332 |
| 4,500,631 A | 2/1985 | Sakamoto et al. | 430/413 |
| 4,567,073 A | 1/1986 | Larson et al. | 428/40 |
| 4,576,850 A | 3/1986 | Martens | 428/156 |
| 4,588,258 A | 5/1986 | Hoopman | 350/103 |
| 4,605,592 A | 8/1986 | Paquette et al. | 428/334 |
| 4,614,667 A | 9/1986 | Larson et al. | 427/54.1 |
| 4,649,064 A | 3/1987 | Jones | 427/256 |
| 4,861,644 A | 8/1989 | Young et al. | 428/195 |

(List continued on next page.)

FOREIGN PATENT DOCUMENTS

| | | | |
|---|---|---|---|
| DE | 2651427 A1 | 5/1978 | |
| EP | 0 832 756 A | 4/1998 | |
| GB | 2165164 * | 4/1986 | ............ B05D/1/36 |
| JP | 07 089217 | 4/1995 | |
| JP | 08 002096 | 1/1996 | |
| JP | 90-86034 A | 3/1997 | |
| JP | 09-086034 * | 3/1997 | ............ B41M/5/00 |
| JP | 91-27327 A | 5/1997 | |
| JP | 91-75004 A | 7/1997 | |
| WO | WO 92/07723 | 5/1992 | |
| WO | WO 92/07899 | 5/1992 | .............. C08J/7/04 |
| WO | WO 92/13924 | 8/1992 | .............. C09J/7/02 |

(List continued on next page.)

OTHER PUBLICATIONS

Merriam–Webster's Collegiate Dictionary, 10$^{th}$ ed. (Merriam Webster, Inc., MA), p. 886, 1998.

"DNA Chips Come of Age"—Chem. & Eng. News pp. 42–43 Dec. 9, 1996.

*Primary Examiner*—Bruce H. Hess
*Assistant Examiner*—Michael E. Grendzynski
(74) *Attorney, Agent, or Firm*—Scott A. Bardell

(57) ABSTRACT

A receptor medium with a sheet having an embossed imaging surface as one major surface thereof The receptor medium can receive jettable materials, which include inks, adhesives, biological fluids, chemical assay reagents, particulate dispersions, waxes, and combinations thereof. The embossed medium unexpectedly solves such common inkjet printing problems as feathering, banding, and mudcracking in inkjet printing systems by controlling how an inkjet drop contacts and dries on an inkjet receptor medium. Clear lines of demarcation between adjoining colors of a pigmented inkjet image graphic can be obtained, Methods of making and using the inkjet receptor medium are also disclosed.

16 Claims, 9 Drawing Sheets

U.S. PATENT DOCUMENTS

| | | | |
|---|---|---|---|
| 4,903,041 A | 2/1990 | Light | 346/1.1 |
| 4,904,519 A | 2/1990 | Newman | 428/203 |
| 4,935,307 A | 6/1990 | Iqbal | 428/500 |
| 5,002,825 A | 3/1991 | Mimura et al. | 428/315.5 |
| 5,023,129 A | 6/1991 | Morganti | 428/195 |
| 5,045,386 A | 9/1991 | Stan et al. | 428/262 |
| 5,084,338 A | 1/1992 | Light | 428/337 |
| 5,138,488 A | 8/1992 | Szczech | 359/529 |
| 5,141,790 A | 8/1992 | Calhoun | 428/40 |
| 5,141,797 A | 8/1992 | Wheeler | 428/195 |
| 5,175,030 A | 12/1992 | Lu et al. | 428/30 |
| 5,183,597 A | 2/1993 | Lu | 264/1.4 |
| 5,192,548 A | 3/1993 | Valasquez et al. | 424/443 |
| 5,202,190 A | 4/1993 | Kantner | 428/447 |
| 5,208,092 A | 5/1993 | Iqbal | 428/195 |
| 5,212,008 A | 5/1993 | Malhotra | 428/216 |
| 5,213,873 A | 5/1993 | Yasuda | 428/195 |
| 5,219,462 A | 6/1993 | Bruxvoort et al. | 51/293 |
| 5,229,207 A | 7/1993 | Paquette et al. | 428/355 |
| 5,271,765 A | 12/1993 | Ma | 106/22 |
| 5,290,615 A | 3/1994 | Tushaus | 428/40 |
| 5,302,437 A | 4/1994 | Idei et al. | 428/195 |
| 5,342,688 A | 8/1994 | Kitchin et al. | 428/402 |
| 5,344,681 A | 9/1994 | Calhoun et al. | |
| 5,354,813 A | 10/1994 | Farooq et al. | 525/326.7 |
| 5,378,638 A | 1/1995 | Deeg | 436/518 |
| 5,437,754 A | 8/1995 | Calhoun | 156/231 |
| 5,449,540 A | 9/1995 | Calhoun et al. | 428/42 |
| 5,450,235 A | 9/1995 | Smith | 359/529 |
| 5,589,269 A | 12/1996 | Ali et al. | 428/411.1 |
| 5,601,928 A | 2/1997 | Katayama et al. | 428/500 |
| 5,605,750 A | 2/1997 | Romano et al. | 428/304.4 |
| 5,658,802 A | 8/1997 | Hayes | 436/518 |
| 5,712,027 A | 1/1998 | Ali et al. | 428/212 |
| 5,753,350 A | 5/1998 | Bright | 428/195 |
| 5,756,183 A | 5/1998 | Kutsch et al. | 428/156 |
| 5,965,243 A | 10/1999 | Butler et al. | |

FOREIGN PATENT DOCUMENTS

| | | | |
|---|---|---|---|
| WO | WO 96/33839 | 10/1993 | B23K/26/06 |
| WO | WO 97/17207 | 5/1997 | B41M/5/00 |
| WO | WO 97/18950 A1 | 5/1997 | |
| WO | WO 97/33758 | 9/1997 | B41M/5/00 |
| WO | WO 98/29516 | 7/1998 | |
| WO | WO 98/45054 | 10/1998 | |
| WO | WO 99/65999 | 12/1999 | |

\* cited by examiner

EMBOSSED RECEPTOR MEDIA

This application is a division of patent application Ser. No. 09/069,665 filed Apr. 29, 1998, now abandoned.

FIELD OF INVENTION

This application relates to inkjet printing media to improve drying times of the inkjet ink, improve abrasion resistance of the inkjet image after drying, and prevent visual defects caused by ink beading, ink spreading, or mudcracking, resulting in improved print quality.

BACKGROUND OF INVENTION

Image graphics are omnipresent in modern life. Images and data that warn, educate, entertain, advertise, etc. are applied on a variety of interior and exterior, vertical and horizontal surfaces. Nonlimiting examples of image graphics range from advertisements on walls or sides of trucks, posters that advertise the arrival of a new movie, warning signs near the edges of stairways.

The use of thermal and piezo inkjet inks have greatly increased in recent years with accelerated development of inexpensive and efficient inkjet printers, ink delivery systems, and the like.

Thermal inkjet hardware is commercially available from a number of multinational companies, including without limitation, Hewlett-Packard Corporation of Palo Alto, Calif., USA; Encad Corporation, of San Diego, Calif., USA; Xerox Corporation of Rochester, N.Y., USA; ColorSpan Corporation of Eden Prairie, Minn., USA; and Mimaki Engineering Co., Ltd. of Tokyo, Japan. The number and variety of printers change rapidly as printer makers are constantly improving their products for consumers. Printers are made both in desk-top size and wide format size depending on the size of the finished image graphic desired. Nonlimiting examples of popular commercial scale thermal inkjet printers are Encad's NovaJet Pro printers and HP's 650C, 750C, and 2500CP printers. Nonlimiting examples of popular wide format thermal inkjet printers include HP's Design printers, where the 2500CP is preferred because it has 600×600 dots/inch (dpi) resolution with a drop size in the vicinity of about 20 picoliters.

3M markets Graphic Maker Inkjet software useful in converting digital images from the Internet, ClipArt, or Digital Camera sources into signals to thermal inkjet printers to print such image graphics.

Inkjet inks are also commercially available from a number of multinational companies, particularly 3M which markets its Series 8551; 8552; 8553; and 8554 pigmented inkjet inks. The use of four process colors: cyan, magenta, yellow, and black (generally abbreviated "CMYK") permit the formation of as many as 256 colors or more in the digital image.

Media for inkjet printers are also undergoing accelerated development. Because inkjet imaging techniques have become vastly popular in commercial and consumer applications, the ability to use a personal, computer to print a color image on paper or other receptor media has extended from dye-based inks to pigment-based inks. And the media must accommodate that change. Pigment-based inks provide more durable images because of the large size of colorant as compared to dye Molecules.

Inkjet printers have conic into general use for wide-format electronic printing for applications such as, engineering and architectural drawings. Because of the simplicity of operation and economy of inkjet printers, this image, process holds a superior growth potential promise for the printing industry to produce wide format, image on demand, presentation quality graphics.

Therefore, (he components of an inkjet system used for making graphics can be grouped into three major categories:
1. Computer, software, printer.
2. Ink.
3. Receptor medium.

The computer, software, and printer will control the size, number and placement of the ink drops and will transport the receptor medium through the printer. The ink will contain the colorant which forms the image and carrier for that colorant. The receptor medium provides the repository which accepts and holds the ink. The quality of the inkjet image is a function of the total system. However, the composition and interaction between the ink and most important in an inkjet system.

Image quality is what the viewing public and paying customers will want and demand to see. From the producer of the image graphic, many other obscure demands are also placed on the inkjet media/ink system from the print shop. Also, exposure to the environment can place additional demands on the media and ink (depending on the application of the graphic).

Current inkjet receptor media are direct coated with a dual layer receptor according to the disclosure contained in PCT International Patent Publication WO97/17207 (Warner et al.) and are marketed by 3M under the brands 3M™ Scotchcal™ Opaque Imaging Media 3657-10 and 3M™ Scotchcal™ Translucent Imaging Media 3637-20. Another inkjet receptor media is disclosed in copending, coassigned, U.S. patent application Ser. No. 08/614,986 (Steelman et al.) which combines a hygroscopic layer on a hydrophilic microporous media.

Inkjet inks are typically wholly or partially water-based, such as disclosed in U.S. Pat. No. 5,271,765. Typical receptors for these inks are plain papers or preferably specialty inkjet receptive papers which are treated or coated to improve their receptor properties or the quality of the images resulting therefrom, such as disclosed in U.S. Pat. No. 5,213,873.

Many inkjet receptor compositions suitable, for coating onto plastics to make them inkjet receptive have been disclosed. Applications for overhead transparencies are known in the art. These are composed of transparent plastic materials such as poly(ethylene terephthalate), which alone will not accept the aqueous inks and are therefore coated with receptor layers. Typically these receptor layers are composed of mixtures of water soluble polymers which can absorb the aqueous mixture from which the inkjet ink comprises. Very common are hydrophilic layers comprising poly(vinyl pyrrolidone) or poly(vinyl alcohol), as exemplified by U. S. Pat. Nos. 4,379,804; 4,903,041; and 4,904,519. Also known are methods of crosslinking hydrophilic polymers in the receptor layers as disclosed in U.S. Pat. Nos. 4,649,064; 5,141,797; 5,023,129; 5,208,042; and 5,212,008. Other coating compositions contain water-absorbing particulates such as inorganic oxides, as disclosed in U.S. Pat. Nos. 5,084,338; 5,023,129; and 5,002,825. Similar properties are found for inkjet paper receptor coatings, which also contain particulates, such as corn starch as disclosed in U.S. Pat. No. 4,935,307 and 5,302,437.

The disadvantage that many of these types of inkjet receptor media suffer for image graphics is that they comprise water-sensitive polymer layers. Even if subsequently overlaminated still contain a water-soluble or water-swellable layer. This water-sensitive layer can the subject over time to extraction with water, and can lead to damage of the graphic and liftoff of the overlaminate. Additionally, some of the common constituents of these hydrophilic coatings contain water-soluble polymers not ideally Suitable to the heat and UV exposure's experienced in exterior environments, thus limiting their exterior durability, Finally, the drying rate after printing of these materials appears slow since until dry, the coating is plasticized or even partially dissolved by the ink solvents (mainly water) so that the image can be easily damaged and can be tacky before it is dry.

In recent years increasing interest has been shown in microporous films as inkjet receptors to address some or all of the above disadvantages. Both Warner et al. and Steelman et al. applications identified above disclose microporous films to advantage. If the film is absorbent to the ink, after printing the ink absorbs into the film itself into the pores by capillary action and reels dry very quickly because the ink is away from the Surface of the printed graphic. The film need not necessarily contain water-soluble or water swellable polymers, so potentially could be heat and UV resistant and need not be subject to water damage.

Porous films are not necessarily receptive to water-based inkjet if the material is inherently hydrophobic and methods of making them hydrophilic have been exemplified e.g. by PCT Publication WO 92/07899.

Other films are inherently aqueous ink absorptive because of the film material, e.g. Teslin™ (it silica-filled polyolefin microporous film) available form PPG industries and of the type exemplified in U.S. Pat. No. 4,861,644. Possible issues with this type of material are that if used with dye based inks image density can be low depending on how much of the colorant remains inside the pores after drying. One way of avoiding this is to fuse the film following printing as exemplified in ITT Publication WO 92/07899.

Other methods are to coat the microporous film with a receptor layer as disclosed in PCT Patent Publication WO97/33758 (Steelman et al.) and U.S. Pat. No. 5,605,750.

As stated above, the relationship between the ink and the media is key to image graphic quality. With printers now reaching 1400×720 dpi precision, inkjet drop size is smaller than in the past. As stated previously, a typical drop size for this dpi precision, is about 20 picoliters, which is a fraction of the size of prior drop sizes of 140 picoliters used in wide format inkjet printers, most notably and commonly Encad™ NovaJet III, IV, and Pro models. Some printer makers are striving for even smaller drop sizes, while other printer makers are content with the larger drop sizes for large format graphics. With pigmented inkjet inks, drop size determines the quantity of pigment particles that reside in each drop and are to be directed to a predetermined area of media.

When the inkjet ink drop contacts the receptor medium, a combination of two things occur. The inkjet drop diffuses vertically into the medium and diffuses horizontally along the receptor surface, with a resulting spread of the dot.

However, with pigment-based inkjet inks of the right particle size and fused with a film of, the right pore-size, some filtration or the colorant is possible at the surface of the film resulting in a good density and color saturation. However, images can still be very poor if dot-gain is lost due to "banding phenomena" where insufficient ink remains to generate the appropriate halftone image. If dot-size is too small, then errors due to media advancement or failed printhead nozzles can cause banding. This problem would not be seen with larger drop size printers because larger dots could cover up prior printing errors. However, if (lots are too large, then edge acuity is lost. Edge acuity is a reason for increased dpi image precision. Ability to control dot diameter is therefore an important property in an inkjet receptor medium.

U.S. Pat. No. 5,605,750 exemplifies a pseudo-boehmite coating applied to the silica-filled microporous film such as Teslin™. The coating contains alumina particles of pseudo-bochmite of pore radius 10 to 80 Å. Also disclosed is an additional protective layer of hydroxypropylmethyl cellulose.

Several problems exist using receptor coatings mentioned above. The rate of ink absorption is, at most, 8–10 ml/sec/M2; this is slow when compared to the rate of ink drop application. Secondly, the volumes of ink applied by many popular wide format inkjet printers at 140 pl/drop (HP2500: 20 pL/drop but 160 pL/dot) call create problems such as "feathering", "demixing", and coalescence of the ink.

Finally the use of pigment inks has raised additional issues in print quality, most notably "mudcracking". Mudcracking is the term used to describe the observation that swellable receptor coatings take up pigments by filtration of the particles at the surface and swelling to accommodate the carrier. solvents, followed by drying, when the pigment particle film cracks as swelling goes down. The image appears as fragmented as a dried lake bed, with its mud cracked.

SUMMARY OF INVENTION

This invention has utility for the production of image graphics using wide format inkjet printers and pigment-based ink. This invention unexpectedly solve such common inkjet printing problems as feathering, banding, and mudcracking in inkjet printing systems by controlling how an inkjet drop contacts and dries on an inkjet receptor medium.

One aspect of the invention is a receptor medium comprising a sheet having an engineered embossed surface as one major surface thereof, wherein the sheet is nonporous and wherein each element of the engineered embossed surface has a capacity oral least about 20 pL.

"Engineered" means that the embossing are planned and reproducible regardless of the pattern of the embossings.

"Nonporous" means that the unembossed sheet is not substantially porous or having a reticulated outer surface before the imaging surface is embossed.

"Embossed capacity" means that the imaging surface is capable of receiving at least two colors of inkjet ink within or, about each embossed element on the imaging surface.

Preferably, the receptor medium is an inkjet receptor medium.

Preferably, the embossed imaging surface comprises a repeated pattern over the area of the imaging surface. More preferably, the embossed imaging surface is it microembossed pattern. Most preferably, the embossed imaging surface comprises cavities completely enclosed by walls on all sides and packed closely together such Hint (1) thickness of the wall tops is 10 µm or less, (2) crevice volume is commensurate with 100 to 300% ink from the targeted printer, and (3) the number of crevices per inch is equal to, or greater than the number of dots per inch (dpi) of the targeted printer. Additionally, if transparency of the substrate is desired, the walls should have as close to 0° tilt from normal to the surface of the substrate as is possible.

Another aspect of the present invention is an imaged inkjet receptor medium comprising a sheet having in embossed image surface and particles of pigment or dye dried on the embossed image surface.

Another aspect of the invention is a method of making an inkjet receptor medium, comprising the steps of (a) selecting an embossing, mold with a molding surface having a microreplicated topography, and (b) contacting the molding surface of the mold against it polymeric sheet to form an embossed surface on the sheet mirroring the microreplicated topography.

Another aspect of the invention in a method of making all inkjet receptor medium comprising the steps of (a) selecting ail embossing mold with a molding surface having a microreplicated topography, (b) extruding a polymer over the molding surface of the mold to form a polymeric sheet having an embossed surface on the sheet mirroring the microreplicated topography.

A feature of the invention is an embossed image surface having a pattern of cavities or wells to contain the ink drops contacting the surface during inkjet printing, with at least as many cavities or wells as the printing resolution contemplated for the image printed on the image surface.

Another feature of the invention is all embossed image surface having a pattern of posts protruding from the surface which can trap liquid inkjet inks around the base of the post where the post and the flat sheet surface intersect.

Another feature of the invention is the ability to emboss an inkjet receptor medium with a pattern selected to maximize the match of the volume of the cavity with the volume of all ink likely to be deposited in that cavity.

Another feature to of the invention is the use of surface tension in the ink to minimize surface area of the inkjet image to only those locations on the topography of the embossed image surface where the maximum imaging precision is obtained.

Another feature of the invention is the ability to engineer embossed inkjet receptor media, such that the number of cavities meets or exceeds the desired resolution of the inkjet printing process. For example, one can tailor media of the present invention to match 300×300 dots/inch (dpi) printing resolution by embossing a sheet to have at least 90,000 cavities/square inch.

An advantage of the invention is the minimization of common inkjet printing problems, such is handing, feathering, bleeding, and mudcracking, by altering the receiving surface of the inkjet receptor media rather than altering the formulation of the inkjet inks.

Another advantage of the invention is case by which all embossed image surface can be formed.

Another advantage of the invention is the control of the appearance of inkjet images where the ink used is a pigmented water-based ink.

Another advantage of the present invention is the protection of the inkjet image from abrasion at the surface of the inkjet receptor medium because the colored entities forming the image reside within cavities of the topography of the embossed image surface or around the base of a post. As such, the medium of the present invention provides abrasion resistance, smear resistance, and prevention of feathering or bleeding of the image.

Another advantage of the invention is the usefulness of the embossed image surface with organic solvent-based, water-based, phase change, or radiation polymerizable inks. The inks can further comprise either dye or pigment based colorants.

The embodiments of the invention that follow will identify other features and advantages.

BRIEF DESCRIPTION OF DRAWINGS

FIG. 1 is an illustrative cross-sectional view of an envisioned sequence of inkjet drop deposition, drying, and final appearance, wherein

FIG. 2 shows 50X photomicrographs or media of the present invention as imaged, wherein FIG. 2a shows a control media and wherein

FIG. 3 shows 50X photomicrographs of media of the present invention, wherein FIG. 3a shows a printed commercial coated substrate as a control, while

FIG. 4 shows another embodiment of media of the present invention, wherein FIG. 4a shows the CIRCLE pattern used for testing the performance of the media while

FIG. 5 shows another embodiment of the present invention magnified 100 X with FIG. 5a showing the media before printing while

FIG. 9 shows portion of a test print, unmagnified, with FIG. 9a showing the test print on control media while

EMBODIMENTS OF INVENTION

Embossed Image Surface

Figure 1A:
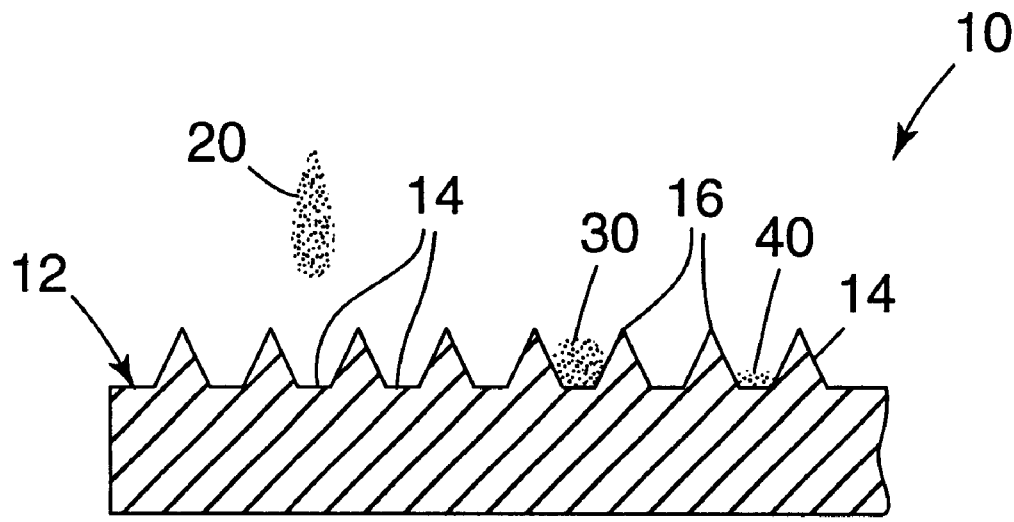
FIG. 1a represents void patterns and FIG. 1b represents post patterns.

FIG. 1a illustrates the premise or the present invention: an inkjet receptor medium 10 that can be constructed to have all embossed image surface 12 of multiple cavities or wells 14 for receiving and protecting pigment particles contained in an inkjet ink and multiple peaks 16.

At the left side of FIG. 1a, one sees an inkjet drop 20, typically ranging in size from about 10 to about 150 and preferably from about 20 to about 140 pL, approaching embossed image surface 12.

In the middle of FIG. 1a, one sees an inkjet drop 30 within one cavity 14 as drop 30 begins to dry, cure, or otherwise coalesce, depending on the nature of the inkjet ink formulation.

On the right of FIG. 1a, one sees all inkjet drop 40 that has dried and residing within a cavity 14 such that it is protected from abrasion from items contacting the multiplicity of peaks 16 that, on a macroscopic level, constitute the outermost surface of medium 10.

Figure 1B:
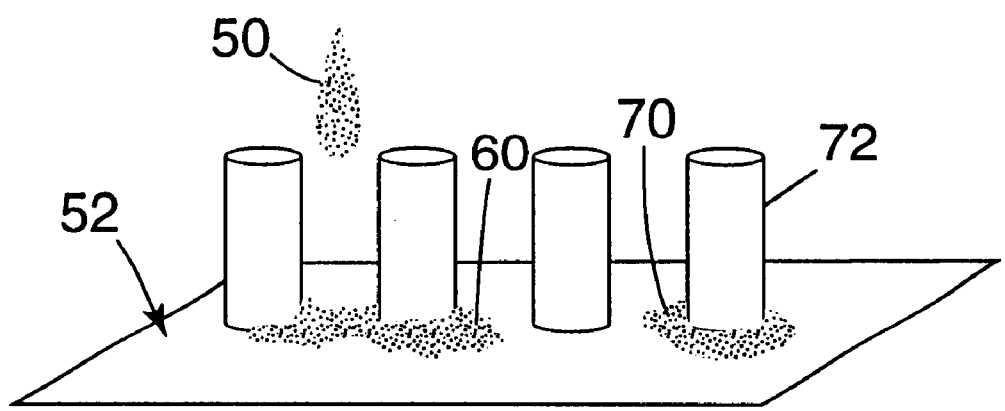

FIG. 1b shows a post pattern embodiment of the present invention. At the left side of FIG. 1b, one sees ail inkjet drop 50, typically ranging in size from about 10 to about 150 and preferably from about 20 to about 140 pL, approaching embossed image surface 52.

In the middle or FIG. 1b, one sees ink 60 on such surface 52 as drop 30 begins to dry, cure, or otherwise coalesce, depending on the nature of the inkjet ink formulation.

On the right of FIG. 1b, one sees ink 70 that has dried about a post 72 such that it is protected from abrasion from items contacting the multiplicity of peaks 16 that on a macroscopic level, constitute the outermost surface of medium 10.

FIGS. 1a and 1b also illustrate an important hallmark of the present invention: the use of ink surface tension to minimize the surface area of the dried ink on the inkjet medium. Depending on the shape of the cavities and peaks or posts one embodiment of the invention has found the presence of a continuous layer of dried ink in connecting cavities around a single peak. This ability to manipulate interfacial tension opens many possibilities of precision inkjet printing to one skilled in the art, such as use of different half tone patterns and control of dot gain, forcing the ink into the crevices.

Ideally, if desired, one skilled in the art could create one image seen from one perspective toward the inkjet medium with a second or more images seen from other perspectives. For example, one could see one image graphic viewed from the extreme left side of the medium because ink drops gather under surface tension at the left slope of the cavities, while one could see the second image graphic from the extreme right side of the medium because ink drops of a different formulation gather under that different surface tension on the right side of the cavities.

FIG. 1a also illustrates an important consideration of the invention: more than one drop of ink is destined to reside in a single cavity, because mixing of the colors: cyan, yellow, and magenta are needed to create the infinite number of colors now demanded in inkjet printing. Thus one should size the volume of cavities to anticipate the placement of as many as three drops of different colors in order to satisfy multi-color printing. The volume of a cavity can range from about 20 to about 1,000 and preferably from about 60 to about 600 pL.

The designed volume of the cavities depends on the desired shape of the cavities and the printed ink drop volume. While the illustration or FIG. 1a shows curvilinear slopes to the bottom of a cavity 14 between adjacent peaks 16, a variety of embossing geometries can be chosen within the scope of the invention.

Nonlimiting examples of to topographies for cavities 14 range from the extreme of cubic cavities with parallel vertical, planar walls to the extreme of hemispherical cavities, with any possible solid geometrical configuration of walls in between those extremes. Preferred examples of topographies for cavities 14 include conical cavities with angular, planar walls; truncated pyramid cavities with angular, planar walls, and cube-corner shaped cavities.

One acceptable way of characterizing the cavity structure is to identify aspect ratios for such cavities. "Aspect ratio" means the ratio of depth to width of the cavity. The aspect ratio of cavities 14 call range from about 0.3 to about 2 and preferably from about 0.5 to about 1.

The overall depth of cavities 14 depends on the shape or the cavity, aspect ratio, and the desired volume for the cavity, described above. For a cubic-shaped cavity, the depth ranges from about 25 to about 75 $\mu$m. For a hemispherical-shaped cavity, the depth ranges from about 35 to about 70 $\mu$m The depth of another geometrically-shaped cavity resides in between these extremes for a given volume.

For example, a cube having 75 $\mu$m sides and depth, 5 $\mu$m walls with all aspect ratio of 1, giving a void volume of 420 pL capable of holding three drops of ink from a Hewlett-Packard 51626 print cartridge.

More preferably, the shape of cavities 14 has a 85 $\mu$m square face at the top of the cavity 14, a 75 $\mu$m depth, a 5 $\mu$m or less wall thickness at the top of cavity 14 with a 15° tilt to normal, i.e., to a "floor" at the bottom of cavity of a 44 $\mu$m square. This solid geometry is a truncated pyramid generally.

The following algorithm can project the volume and depth of cavities for a variety of shapes or cavities:

1. Input drop volume of ink and printer dpi
2. Select pattern (cube corner prism, cube, pyramid, truncated pyramid, or hemi-ellipse)
3. The center to center distance of the cavities is determined from the input dpi where the goal is to minimize unembossed surface area, keeping the number of crevices in a square inch equal to or greater than the drops of ink deposited per square inch for 100% fill. For, example, for a 300 dpi printer, 300×300=90,000 crevices/square inch or more is useful.
4. The volume of three ink drops is calculated
5. The volume of each crevice of the chosen shape is calculated. The depth of each crevice is then chosen so that the volume of each crevice is as close as possible to that calculated in step 4.

Polymeric Film

The polymeric sheet used in the inkjet medium can be made from any polymer capable of being embossed in the manner of the present invention. The sheet can be a solid film. The sheet can be transparent, translucent, or opaque, depending on desired usage. The sheet can he clear or tinted, depending on desired usage. The sheet can be optically transmissive, optically reflective, or optically retroreflective, depending on desired usage.

Nonlimiting examples of polymeric films include thermoplastics such as polyolefins, poly(vinyl chloride), copolymers of ethylene with vinyl acetate or vinyl alcohol, fluorinated thermoplastics such as copolymers and terpolymers of hexafluoropropylene and surface modified versions thereof, poly(ethylene terephthalate and copolymers thereof, polyurethanes, polyimides, acrylics, and filled versions of the above using fillers such as silicates, aluminates feldspar, talc, calcium carbonate, titanium dioxide, and the like. Also useful in the application are non-wovens, coextruded films, and laminated films made from the materials listed above.

More specifically, polyolefins can be ethylene homopolymers or copolymers, such as "7C50" brand ethylene propylene copolymer commercially available from Union Carbide Co. of Houston, Tex., USA. Other specifically useful films include THV-500 from Dyncon LLC, plasticized poly(vinyl chloride), poly(ethylene terephthalate) copolymer Eastar 6763 from Eastman, Affinity PL 1845 from Dow Chemical, and Surlyn™ acrylic acid copolymers from DuPont.

Properties of polymeric sheets of the present invention can be augmented with outer coatings that improve control to of the ink receptivity of the embossed image surface 12 of the ink receptor medium 10. As stated in the Background of the Invention above, any number of coatings are known to those skilled in the art. It is possible to employ any of these coatings in combination with the embossed image surface of the present invention.

Preferably, one can employ a fluid management system as disclosed in copending, coassigned U.S. patent application Ser. No. 08/892,902 (Waller el al.), the disclosure of which is incorporated by reference herein. Briefly, a variety of surfactants or polymers can be chosen to provide particularly suitable surfaces for the particular fluid components of the pigmented inkjet inks. Surfactants can be cationic, anionic, nonionic, or zwitterionic. Many of each type of surfactant are widely available to one skilled in the art. Accordingly, any surfactant or combination of surfactants or polymer(s) that will render said substrate hydrophilic and can be employed.

These surfactants can he imbibed into recessed surfaces of the embossed substrate. Various types of surfactants have been used in the coating systems. These may include but are not limited to fluorochemical, silicon and hydrocarbon-based ones wherein the said surfactants may be cationic, anionic or nonionic. Furthermore, the nonionic surfactant may be used either as it is or in combination with another anionic surfactant in an organic solvent or in a mixture of water and organic solvent, the said organic solvents being selected from the group of alcohol, amide, ketone and the like.

Various types of non-ionic surfactants can be used, including but not limited to: Dupont's Zonyl fluorocarbons (e.g., Zonyl FSO); 3M's FC-170 or 171 surfactants; BASF's (Pluronic) block copolymers of ethylene and propylene oxide to in ethylene glycol base; ICI's (Tween) polyoxyethylene sorbitan fatty acid esters; Rohm and Haas's (Triton X series) octylphenoxy polyethoxy ethanol; Air Products and Chemicals, Inc. (Surfynol) tetramethyl decynediol; and Union Carbide's Silwet L-7614 and L-7607 silicon surfactants and the like known to those skilled in the art.

Various types of hydrocarbon-based anionic surfactants can also be used, including but not limited to: American Cyanamid's (Aerosol OT) surfactants like dioctylsulfosuccinate-Na-salt or dialkylsulfosuccinate-Na-salt.

Various types of cationic surfactants call also be used, including but not limited to: benzalkonium chloride, a typical quaternary ammonium salt.

Other coating materials may be used which are intended to improve the appearance or durability of the embossed and printed substrate. Many examples of inkjet receptor coatings may be found in the patent literature; for example, bochmite alumina based coatings, silica based coatings, and the like should not be considered outside the scope of the invention. If the targeted printer prints aqueous dye inks, then a suitable mordant may be coated onto the embossed surface in order to demobilize "fix" the dyes. Mordants which may be used generally consist of, but are not limited to, those found in patents such as U.S. Pat. No. 4,500,631; U.S. Pat. Nos. 5,342,688, 5,354,813; U.S. Pat. No. 5,589,269; and U.S. Pat. No. 5,712,027. Various blends of these materials with other coating materials listed herein are also within the scope of the invention.

Additionally, directly affecting the substrate by means generally known in the art may be employed in the context of this invention. For example, corona treated poly(ethylene terephthalate) or surface dehydrochlorinated poly(vinyl chloride) could be embossed and used as a printable substrate.

Optional Adhesive Layer and Optional Release Liner

The receptor medium 10 optionally but preferably has an adhesive layer on the major surface of the sheet opposite embossed image surface 12 that is also optionally but preferably protected by a release liner. After imaging, the receptor medium 10 can the adhered to a horizontal or vertical, interior or exterior surface to warn, educate, entertain, advertise, etc., The choice of adhesive and release liner depends on usage desired for the image graphic.

Pressure sensitive adhesives can be any conventional pressure sensitive adhesive that adheres to both the polymer sheet and to the surface of the item upon which the inkjet receptor medium having the permanent, precise image is destined to be placed. Pressure sensitive adhesives are generally described in Satas, Ed., *Handbook of Pressure Sensitive Adhesives* 2nd Ed. (Von Nostrand Reinhold 1989), the disclosure of which is incorporated by reference. Pressure sensitive adhesives commercially available from a number of sources. Particularly preferred are acrylate pressure sensitive adhesives commercially available from Minnesota Mining Manufacturing Company of St. Paul, Minn. and generally described in U.S. Pat. Nos. 5,141,790, 4,605, 592, 5,045,186, and 5,229,207 and EPO Patent Publication EP 0 570 515 131 (Steelman et al.).

Release liners are also well known and commercially available from a number of sources. Nonlimiting examples of release liners include silicone coated kraft paper, silicone coated polyethylene coated paper, silicone coated or non-coated polymeric materials such as polyethylene or polypropylene, as well as the aforementioned base materials coated with polymeric release agents such as silicone urea, urethanes, and long chain alkyl acrylates, such as defined in U.S. Pat. Nos. 3,957,724; 4,567,073; 4,313,988; 3,997,702; 4,614,667; 5,202,190; and 5,290,615; the disclosures of which are incorporated by referenced herein and those liners commercially available as Polyslik brand liners from Rexam Release of Oakbrook, Ill., USA and EXHERE brand liners from P.H. Glatfelter Company of Spring Grove, Pa., USA.

Method of Forming Embossed Image Surface

The embossed image surface can be made from any contacting technique such as casting, coating, or compressing techniques. More particularly, microreplication can be achieved by at least any of (1) casting using a tool having a microembossed pattern, (2) coating of a fluid onto a substrate having that microembossed pattern, or (3) passing through a nip roll to compress a thermoplastic film against a substrate having that microembossed pattern. Desired embossing topography can be formed in tools via any of a number of well-known techniques selected depending in part upon the tool material and features of the desired topography. Illustrative techniques include etching (e.g., via chemical etching, mechanical etching, or other ablative means such as laser ablation or reactive ion etching, etc.), photolithography, stereolithography, micromachining, knurling (e.g., cutting knurling or acid enhanced knurling), scoring or cutting, etc. Among the patents that disclose these various techniques include U.S. Pat. Nos. 5,183,597 (Lu); 4,588,258 (Hoopman); and U.S. Pat. No. 5,175,030 (Lu et al.), and PCT Patent Publication WO96/33839, the disclosures of all of which are incorporated by reference herein.

Preferably, embossing tooling can be made by casting a two part curable silicone material over master mold which has the same pattern as desired for the embossed image surface 12 of the inkjet receptor medium 10. The silicone mold therefore has the mirror image (cavity-forming geometry protruding). This mold can then be used in a hot press or in actual extrusion or casting operations. Extrusion, embossing is accomplished by passing the mold through the nip to make embossed sections on the extruded film. Most preferable for extrusion embossing is the use of a metal cast roll which is itself embossed with the mirror image of the pattern which is to be embossed on the thermoplastic sheet.

Compressing Method

The pressure exerted in the press can range from about $4.1 \times 10^4$ to about $1.38 \times 10^5$ kPa and preferably from about $6.9 \times 10^5$ to about $1.0 \times 10^4$ kPa.

The temperature of the press at the mold surface can range from about 100 to about 200° C. and preferably from about 110 to about 150° C.

The dwell time of pressure and temperature in the press can range from about 1 to about 5 min. and preferably from about 90 sec. to about 150 sec. Any generally available commercial hot press may be used, such as Wabash model 20-122TM2WCB press from Wabash MPI of Wabash. Ind., USA.

Extrusion Method

A typical extrusion process for the present invention involves passing an extruded substrate through nip created by a chilled roll and a roll having a surface having a pattern inverse of desired embossed image surface, with the two rolls rotating in opposite directions.

Single screw or twin screw extruders can be used. Conditions are chosen to meet the general requirements which are understood to the skilled artisan. Representative but non-limiting conditions are outlined below.

The temperature profile in file extruder can range from 100° C. to 200° C. depending on the melt characteristics of the resin.

The temperature at the die ranges from 150° C. to 230° C. depending on the melt strength of the resin.

The pressure exerted in the nip can range from about 140 to about 1380 kPa and preferably from about 350 to about 550 kPa.

The temperature of the nip roll can range from about 5 to about 30° C. and preferably from about 10 to about 15° C., and the temperature of the cast roll can range from about 25 to about 60° C. and preferably about 40 to about 50° C.

The Speed of movement through the nip call range from about 0.25 to about 10 M/min and preferably from about 1 to about 5 m/min.

Nonlimiting examples of equipment useful for this extrusion method include single screw extruders such as a 1¼ inch Killion (Killion Extruders, Inc. of Cedar Grove, N.J.) equipped with a gear pump such as a Zenith gear pump to control flow rate, co-rotating twin screw extruders such as a 25 mm Berstorff (Berstorff Corporation of Charlotte, N.C.) and counter-rotating twin screw extruders such as a 30 mm Leistritz (American Leistritz Extruder Corporation of Somerville, N.J.). Flow rate in the a twin screw extruder can be controlled using a weight loss feeders such as a K-tron (K-tron America of Pitman, N.J.) to feed the raw material into the extruder. A film die with adjustable slot is used to form a uniform film out of the extruder.

Usefulness of the Invention

Inkjet receptor media of the present invention can be employed in any environment where inkjet images are desired to be precise, stable, rapid drying, and abrasion resistant. Commercial graphic applications include opaque signs and banners.

Inkjet receptor, media of the present invention can accept a variety of inkjet ink. Formulations to produce rapid drying and precise inkjet images. The topography of the embossed image surface of the inkjet receptor medium call be varied for optimum results, depending on several factors, such as: ink droplet volume, ink liquid carrier composition: ink type (pigment or blend of pigment and dye), and technique (machine speed, resolution, roller configuration); etc.

Commonly, inkjet ink formulations have pigments in water blended with others solvents. Both water and the other solvents carry the pigments into the imaging layer and then continue into membrane for rapid drying of the image in the imaging layer to form the precise image.

The imaging layer of the present invention has been found to control dot location to remain within isolated cavities 14 or surface 12.

For example, a test pattern of 3 overlapping circles of primary colors (cyan, magenta, yellow), secondary colors (red, green blue) and tertiary color (black) inkjet printed onto an inkjet receptor medium of the present invention shows the precision of color control and pigment location on the medium.

Figure 2A:
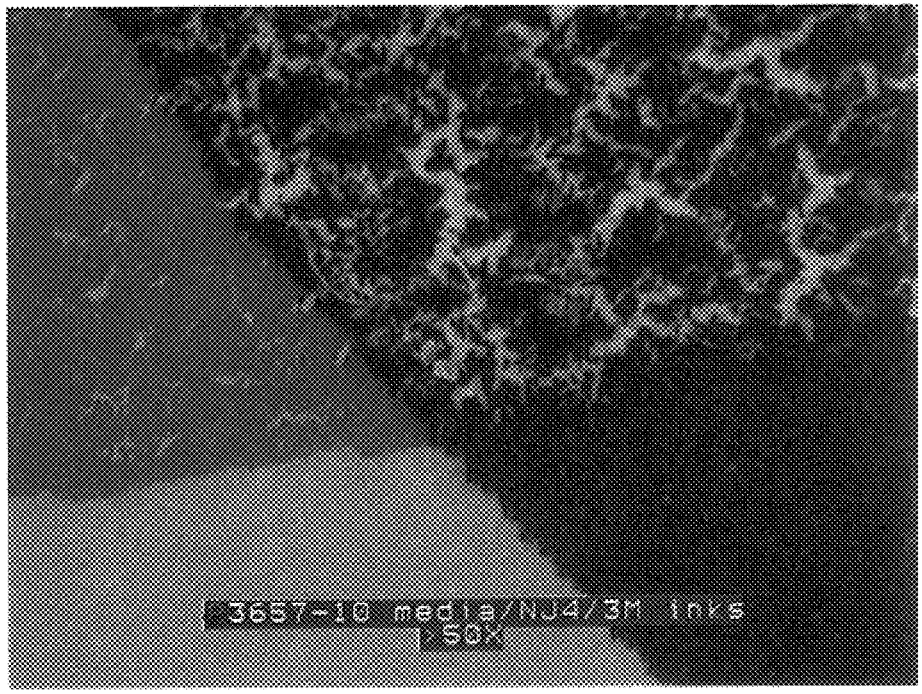
Figure 2B:
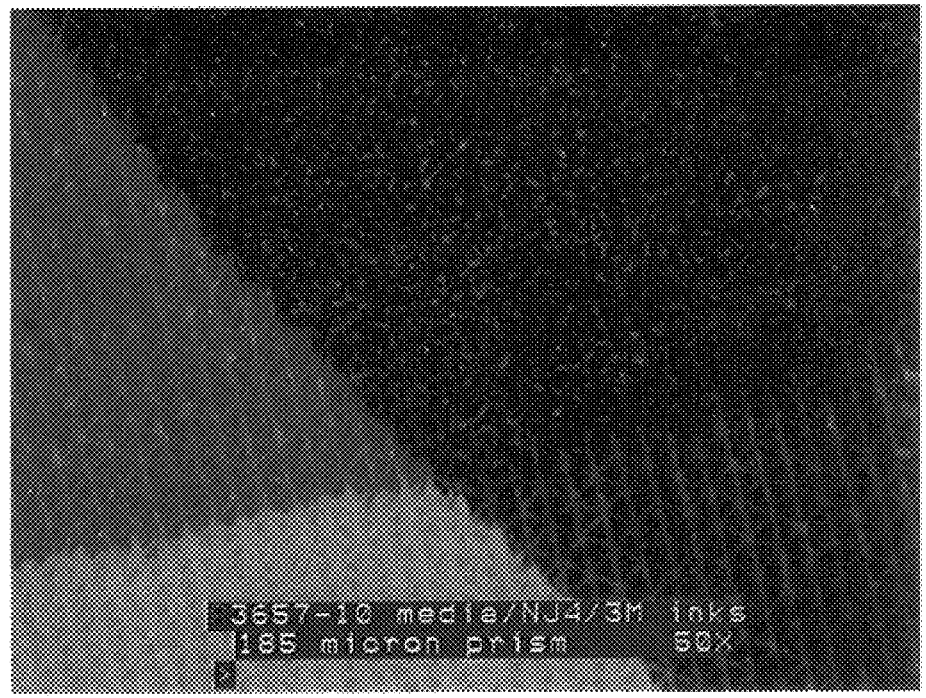
FIG. 2b shows a printed media of the present invention.

FIG. 2b is a photomicrograph of 50X magnification of the intersection of the red, green, black, and yellow colors of a test pattern printed on an embossed image surface having a microembossed pattern of cube corner shapes having a depth of about 87 microns and a tip to base distance on the triangular face of the void of about 175 microns.

The yellow color in the lower left portion of FIG. 2b is supplied by only one pigment, whereas the red and green are formed by the mixing of two primary pigments each and the black by the mixing of the three pigments. The clarity and precision of the lines of demarcation between adjoining colors as well as the continuity of the color within the areas of each of the colors are direct and surprising advantages of the present invention.

Further because the pigment particles reside beneath the nominal macroscopic surface of the inkjet receptor medium, the pigment particles are protected from abrasion that does not penetrate as deep as the location of the particles. Incidental abrasion of the graphic during graphic handling after printing is minimized.

The shape of cavity geometry can contribute significantly to the final appearance of the image graphic because of the appearance of the image caused by presence of pigments residing in cavities 14 having different geometries to the line of sight i.e., one can see pigment deposited on angular planar walls but not on walls parallel to the line of sight.

The possibilities of image manipulation on the surface of an inkjet receptor medium created by the topography of the image surface of that medium are myriad to those skilled in the art, because the same pattern need not cover the entire surface of the medium. For example, different patterns could be employed, stepwise, in gradation, or randomly across an area of inkjet receptor medium, in order to create structured or unstructured appearances for the images printed thereon.

Further, as the skill of inkjet printing increases, both in terms of ink drop size and in terms of inkjet placement, it could become possible that the half tone printing pattern will be so refined as to align the printing pattern of the ink, drop by drop, with the embossed pattern on the medium, cavity by cavity. That would permit full justification of the printing process s resembling the image displayed on a digital color monitor.

Another benefit of the media of the present invention is the controlled rate of drying of the ink drop in each cavity. Drying can be measured as the time required before the image becomes tack free or does not smear when lightly rubbed. Typically, the image feels dry within about 2 minutes and preferably within about 30 seconds after imaging. The use of isolated cavities to minimize migration of color during drying is an advantage in the receptor medium of the invention not previously found in the art.

The formation of precise inkjet images is provided by a variety of commercially available printing techniques. Non-limiting examples include thermal inkjet printers such as DeskJet brand, PaintJet brand, Deskwriter brand, DesignJet brand, and other primers commercially available from Hewlett Packard Corporation of Palo Alto, Calif. Also included are piezo type inkjet printers such as those from Seiko-Epson, Raster Graphics, and Xerox, spray jet printers and continuous inkjet printers. Any of these commercially available printing techniques introduce the ink in a jet spray of a specific image into the medium of the present invention. Drying is much more rapid under the present invention than if the imaging layer were to be applied to a similar non-embossed media.

The media of the present invention call be used with a variety of inkjet inks obtainable from a variety of commercial sources. It should be understood that each of these inks have different formulation, even for different colors within the same ink family. Nonlimiting sources include Minnesota Mining and Manufacturing Company, Encad Corporation, Hewlett Packard Corporation, NuKote, and the like. These inks are preferably designed to work with the inkjet printers described immediately above and in the background section above, although the specifications of the printers and the inks will have to be reviewed for appropriate drop volumes and dpi in order to further refine the usefulness of the present invention.

Media of the present invention call also be employed with other jettable materials i.e., those materials capable of passing through an inkjet printing head. Nonlimiting examples of jettable materials include adhesives, biological fluids, chemical assay reagents, pharmaceuticals, particulate dispersions waxes, and combinations thereof.

Media of the present invention can also be employed, with non-jettable materials so long as an inkjet printing head is not needed to deposit the material on the embossed surface. For example, U.S. Pat. No. 5,658,802 (Hayes et al.) discloses printed arrays for DNA, immunoassay reagents or the like using arrays of eletromechanical dispensers to form extremely small drops of fluid and locate them precisely on substrate surfaces in miniature arrays.

The following examples further disclose embodiments of the invention.

EXAMPLES the center of the pattern, all three circles overlap and 300% ink is deposited to form black. Several different qualitative print properties can be observed using this lest pattern, including dry time, absorption capacity, bleed of one color into another and color density.

Example 1

Swellable Substrates, Coated then Embossed

3M Thermal Inkjet Media 3657-10 was removed from the finished roll with coating, adhesive, and liner intact and set against the CCP embossing mold in a hot press. Conditions which work well for both the 3657-10 and 8502 media were $1.0 \times 10^5$ kPa at 143° C., both platens, for two minutes. Thus the media was embossed after the inkjet receptor coating was applied.

After embossing, the sheets were, cooled and reinserted in the NovaJet III printer for print tests. The print cartridges in the NovaJet III are Hewlett Packard 51626A type and these were filled with 3M's cyan, magenta, yellow, and black pigmented inks (Yellow: TB14002, Lot 01x2; Magenta: TB14003, Lot 01x2A; Cyan: TB14001, Lot 01x2; Black: TB14004, Lot 2A), The print lest called CIRCLES is a simple pattern of the three primary colors (cyan, magenta yellow) which overlap to form secondary colors (blue, red, green) with 200% ink and a three color (300% ink) black at the center. In addition to showing aspects of ink mixing and mudcracking, the pattern is small; this means a short carriage return time of the printer which, in turn, means that problems such as feathering, banding, and coalescence of the ink are maximized.

In comparing the CIRCLE pattern on off-the-roll vs. embossed 3657-10, several differences were evident. FIGS. 1a and 1b are 50X micrographs of the yellow/red/green/black interface of these two samples respectively.

DEFINITION OF EMBOSSED PATTERN

| Shape ID | Description | # Sides at Top | CENTER-CENTER DISTANCE $\mu m$ | Feature Depth $\mu m$ | Wall Thickness $\mu m$ | ° Wall Tilt From Normal To Surface | POST height, diameter & spacing, $\mu m$ |
|---|---|---|---|---|---|---|---|
| CCP | Cube corner prism shaped crevice | 3 | 175 | 87 | Knife edge | 60 | — |
| CUBE | Cube shaped srevice | 4 | 80 | 75 | 5 $\mu m$ | <5 | — |
| RECT | Rectangular shape crevice | 4 | 55 | 25 | 5 $\mu m$ | <5 | — |
| PYR1 | Truneated pyramid shaped crevice | 4 | 90 | 75 | 7 $\mu m$ | 12 | — |
| PYR2 | Pyramid shaped crevice | 4 | 80 | 75 | 5 $\mu m$ | 15 | — |
| POST | Cylinder protruding from substrate surface | — | — | — | — | <5 | 400 (II) 100 (D) 140 (spacing) |

Test Patterns

An internal test pattern used throughout these examples, developed to observe printing of 100%, 200% and 300% of cyan magenta, and yellow inks, is called the CIRCLE pattern. A circle of 100% fill of each of the three colors is printed such that the circles overlap to produce red where the yellow and magenta circles overlap, blue where magenta and cyan overlap, and green where yellow and cyan overlap. At 1. Feathering, most notably of a three color black into a 2° color (red) disappeared.
2. Mudcracking of the pigments on the swellable media disappeared.
3. Separation and/or coalescence or the pigment particles was significantly reduced. Secondary colors (red, green, blue) and the three color black were much more continuous (less blotchy) than on unembossed media. This provides for a deeper, more saturated appearance of the colors.

In a control experiment, a sample of the 3657-10 media was removed, pressed, and printed as described above, except that the embossing mold was turned around to press the smooth side against the media in the press. The resulting CIRCLE print looked the same as for unembossed media.

Figure 3A:
Figure 3B:
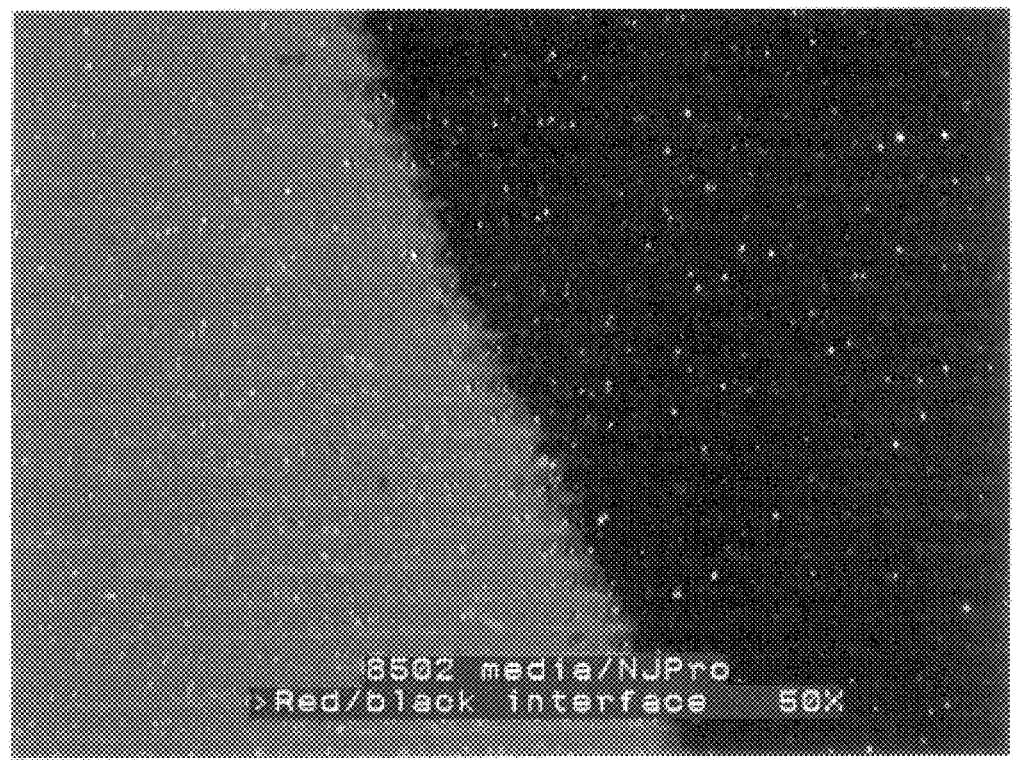
FIG. 3b shows a section of the same substrate after further processing according to file present invention.

This experiment was repeated again using 3M 8502 media and Encad™ Novalnks (GS type) on an Encad™ NovaJet Pro inkjet plotter. Results similar to those noted above were seen, with the exception that dye inks do not suffer from mudcracking problems. The results are exemplified in the 50X micrographs in FIGS. 3a and 3b. FIG. 3a shows the red/black interface of the three circle pattern on 8502 media, where color bleed is evident. By comparison, FIG. 3b shows the same print area on embossed 8502 media. There is, no evidence of color bleed in this sample.

Example 2

Olefin Embossed and Coated with Salt/Surfactant

The CUBE and PYR1 pattern were extrusion embossed on Union Carbide 7C50 (a propylene-ethylene random copolymer). The embossed sheets were coated with a salt/surfactant dispersion, the components of which are listed in the table below. Coating was accomplished using a #3 Mayer rod, a coating rod manufactured by RD Specialties of Webster, N.Y., followed by low heat drying with a heat gun.

| 7C50 Coating Formulation | |
|---|---|
| $Al_2(SO_4)_3$ | 6 wt % |
| Dioctyl sulfosuccinate (DOSS) | 7 wt % |
| Silwet L7607 | 1 wt % |
| Surfynol 204 | 2 wt % |
| Ethanol | 25 wt % |
| Water | 59 wt % |

The coated 7C50 sheets were printed upon using an Encad NovaJet 4 equipped with 3M pigmented inks. The CIRCLES pattern was used to illustrate printing properties. As a control embossed uncoated sheets were printed in the same manner. (A second control, coating onto a flat 7C50 sheet, could not be carried out: the resulting dried coating leaves large salt crystals and sticky puddles of surfactant. The embossed recesses allow for deposition of the material without visible or tactile changes.)

The embossed and coated samples produced very good image quality in the test pattern. There was no feathering evident. The coated sample with the CUBE recesses had a dry time of less than a minute for CMY, 2–3 minutes for RGB, and 5–10 minutes for black. The term "dry" means the ability to withstand smearing with light finger pressure. In comparing these results to those on the uncoated sheets, it was clear that the addition of the coating formulation caused good drying and elimination of feathering and spattering; also, the three color black in the control appeared as dark green.

By comparison, the CUBE embossed and uncoated sample printed satisfactorily on the same printer using the same ink; however, the prints appeared faded and the ink was wet to the touch in the 200% and 300% ink filled areas for several hours after printing.

The next day, it was observed that the coated and printed sample with the CUBE and PYR1 recesses were waterfast and able to withstand hard rubbing under a stream of tap water. Subsequent water soak for 48 hours revealed a stable image. Notably, the uncoated sheets had no water resistance and all ink was easily washed off.

Figure 4A:
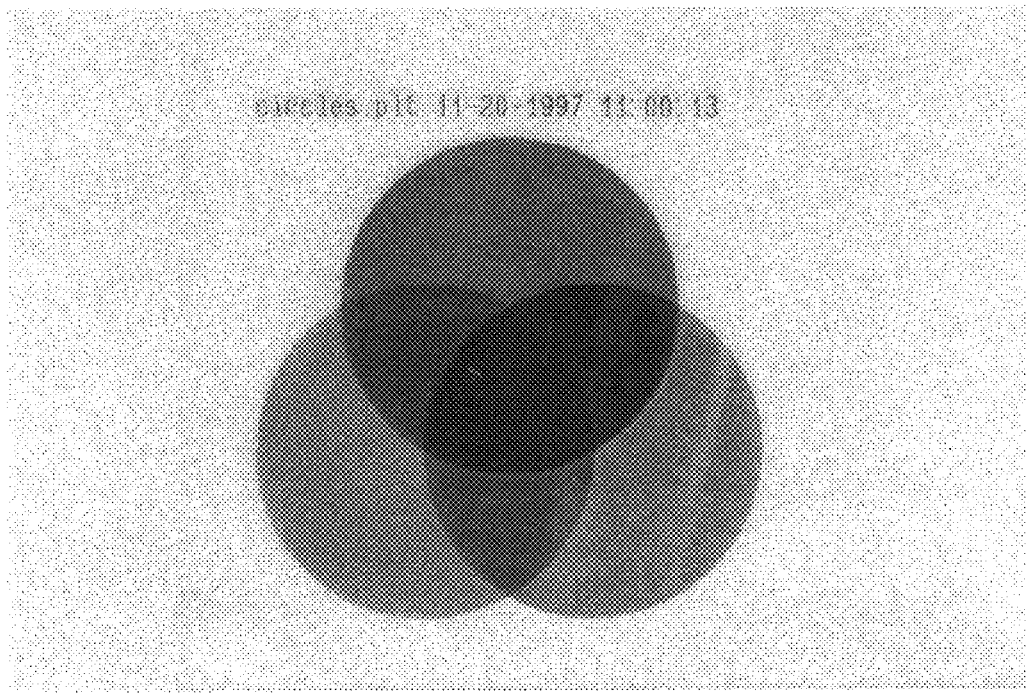
Figure 4B:
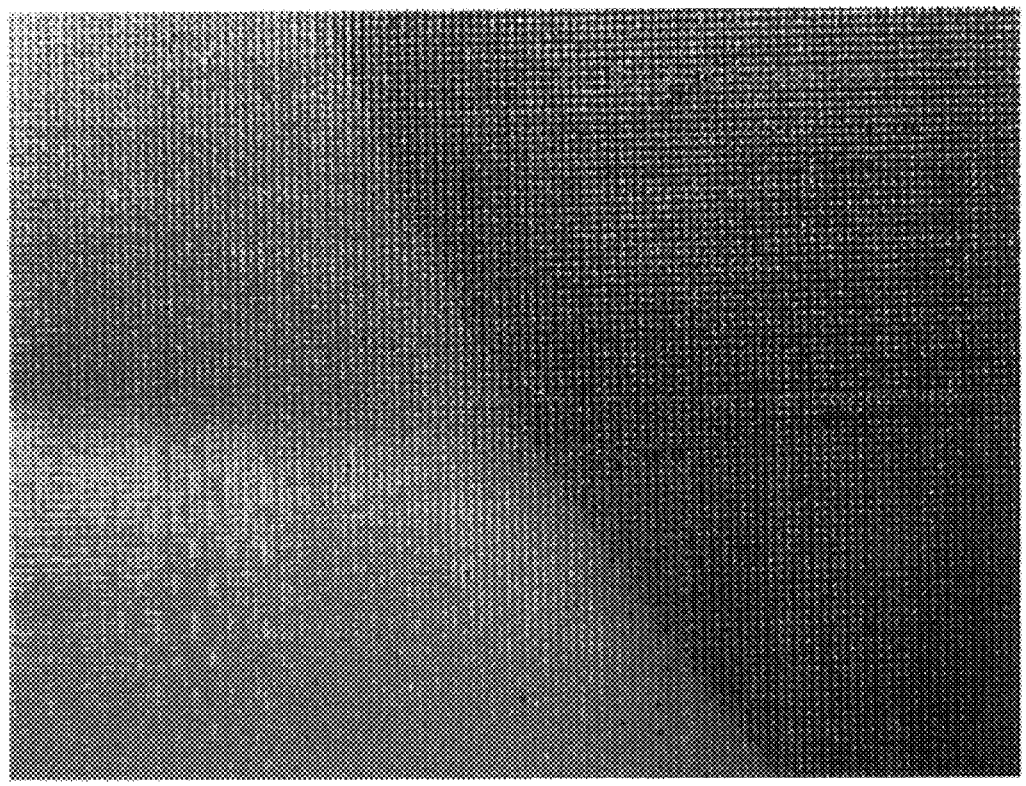
FIG. 4b shows the same pattern, magnified to show the inks residing in embossed crevices.

FIG. 4a shows resolution of the CIRCLE pattern generated on the coated PYR1 patterned 7C50 by the HP2500CP. FIG. 4b is a 25X micrograph of the intersection of black, red, green and yellow printed areas 4a. Note that the resolution of the print is very good. Color density was also good.

Example 3

Transparency of Embossed Substrates on an Overhead Projector

PET copolymer Easter 6763 from Eastman Chemicals, was extrusion embossed with flour patterns for comparison, to an extruded, unpatterned sample of Eastar 6763 as observed as a projection onto a white background from an overhead projector. Using 3M's 9600 overhead projector, the first pattern, CUBE, produced a projection which was as clear as the control sample. RECT also produced a clear projection. PYR2 projected a gray image, and CCP projected a black image.

A sample of 4 mil (0.101 $\mu$m) PET sheeting embossed with the POST pattern was also observed to give a clear projection under the same conditions.

Example 4

Printing on Post Features (protrusions rather than crevices)

Figure 5A:
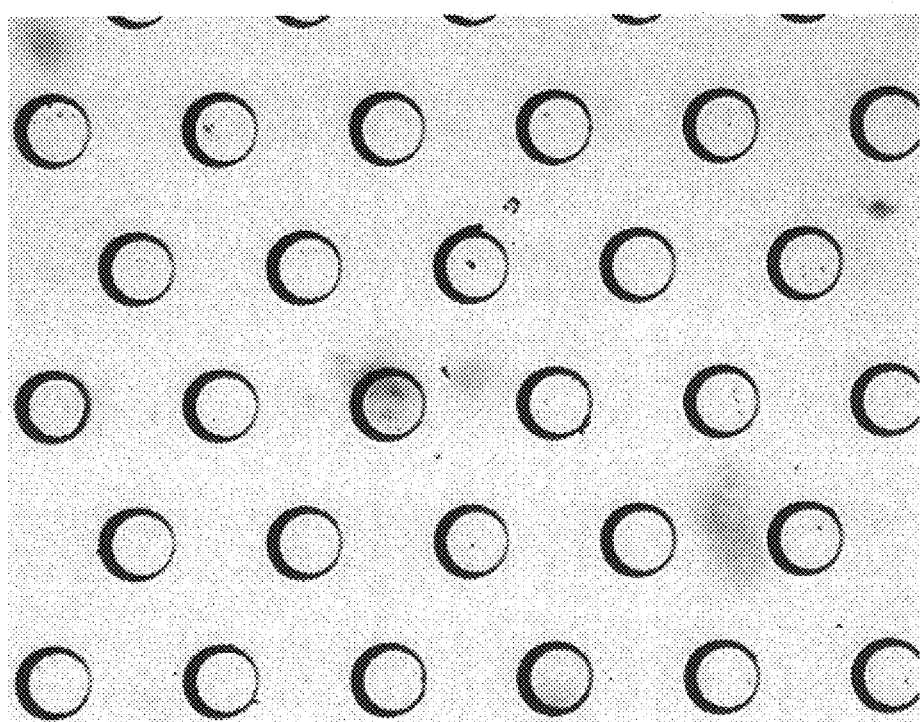
Figure 5B:
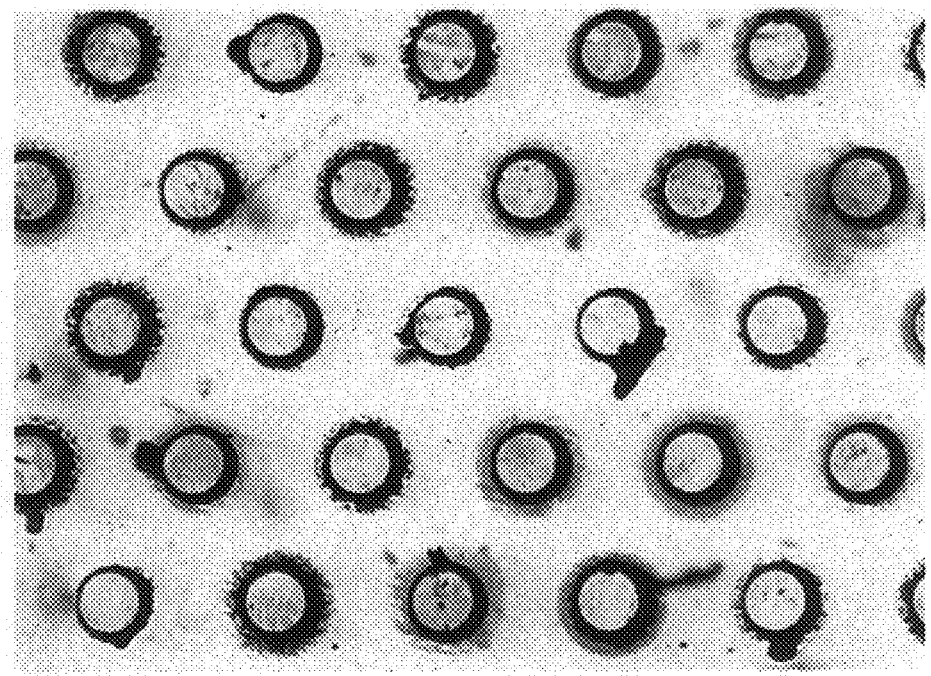
FIG. 5b shows the sample after printing.

A sample of 4 mil (0.101 $\mu$m) PET sheeting embossed with the POST pattern was passed unmodified through a Hewlett-Packard DeskJet 855Cse, to print solid areas of color in cyan, red, blue, green, purple, yellow, and magenta, It was observed that the print was faded but otherwise of good resolution; it was also unsmearable directly out of the printer. By comparison, the same print on an unmodified smooth PET sheet does not make a recognizable pattern and the ink does not dry to the touch even after 24 hours standing at room temperature (21° C.). FIG. 5a is a 100X micrograph of the unprinted post sample. FIG. 5b is the same sample after printing, showing dried cyan ink which is principally located around the base of the posts with almost no ink present in other areas.

Example 5

Printing on Olefin Substrate with Waterborne Inks

A sample of Union Carbide 7C50 film was extruded and embossed with the PYR1 truncated pyramid shaped cavity. An unpatterned sample was also extruded as a control.

These, films were passed unmodified through a Hewlett-Packard 2500CP printer equipped with HP's aqueous pigmented cyan, magenta, yellow, and black inks (black: C1806A, cyan: C1807A; magenta: C1808A; yellow: C1809A). A CIRCLE test pattern was printed on both sheets, The unpatterned sheet was not found to take up the ink in any way, resulting in an unrecognizable print which remained wet and smearable to the touch for more than 24 hours after printing. The patterned sheet was found to give a good quality print, with excellent resolution and no sign of feathering or mixing of colors. Notably, the CM and Y areas as well as the red, green and blue areas were dry immediately to the touch upon removal from the printer. The black area took less than 5 minutes to feel dry and become unsmearable.

Figure 6A:
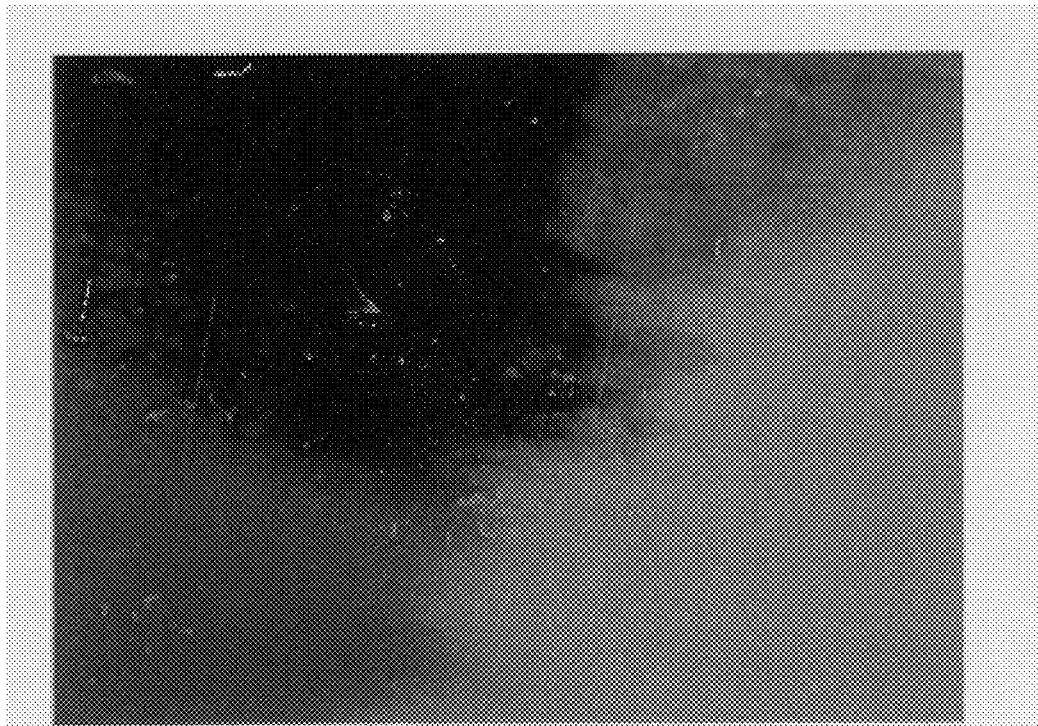
FIG. 6 shows media of the present invention with the CIRCLE pattern printed (hereon, with FIG. 6a showing the print on a control media not microembossed and FIG. 6b showing the same print, at the same magnification, on microembossed media according to the present invention.
Figure 6B:
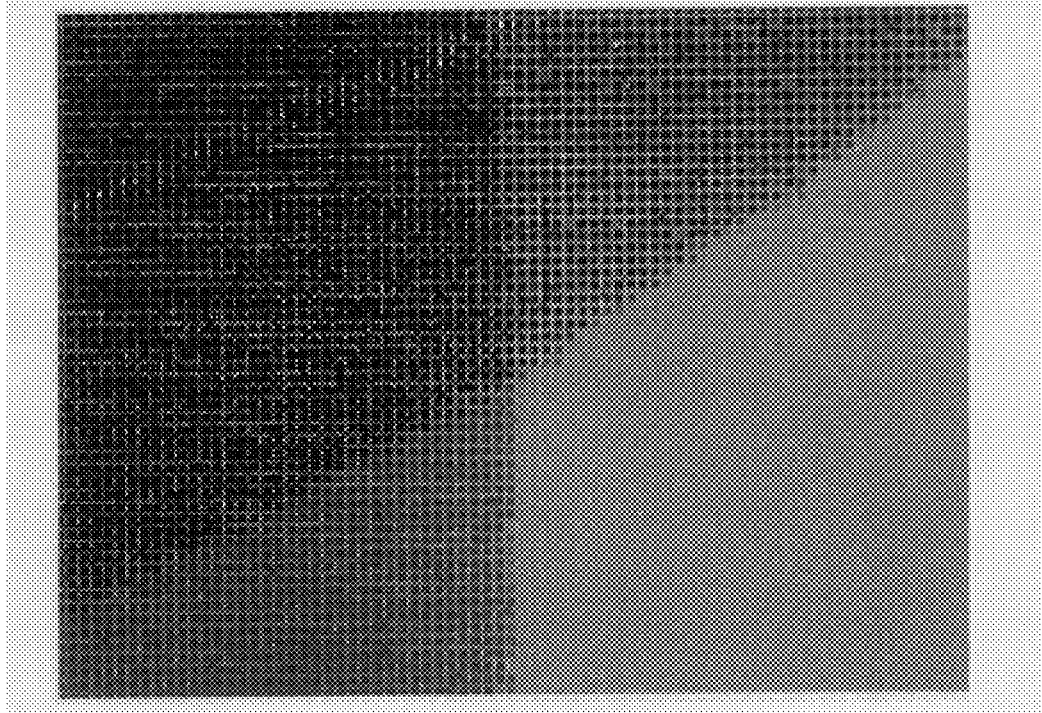

A picture of each of these printed samples is shown in FIGS. 6a and 6b). In a FIG. 6a, the control (smooth) 7C50 sample is shown at 100X to show the lack of ink uptake by the substrate. FIG. 6b shows the print at the same magnification for the PYR1 embossed 7C50 sheet, which exemplifies the effect of embossing: file ink is completely retained in the cavities and thus resolution and lack or feathering, as well as the dry feel, are a direct result of printing on a microembossed substrate.

Comparative Example A

Using the Novajet III printer with pigmented water based inks, a comparative experiment was conducted where plain ethylenepropylene copolymer film (7C50) and textured 7C50 were printed. The texture used consists of long crisscross interconnecting channels. The channel volume per square inch equals the ink volume for 100% coverage per square inch. The non-textured film came out of the printer looking wet, and the ink can be easily wiped off the film surface. The film remained wet and smearable for days. Also, the image suffered from intercolor bleed. The textured film came out of the printer feeling dry to the touch in the primary color areas. The ink did not wipe off the surface. However, the ink wicked along the channels resulting in intercolor bleed and deteriorated image quality. This comparative example illustrates that it is not enough to incorporate structure with the appropriate volume on the film surface to obtained improved image quality, the imparted Structure must form discrete non-connecting crevices.

Example 6

Phase Change Inks

Phase change inks, from Tektronix Company of Oreg., were printed on flat and embossed PVC, 7C50 film and 40 wt% feldspar-filled 7C50. The CCP pattern was used. The Tektronix wax inks were printed using a Tektronix Phaser 300x. For the smooth sheets the ink printed well; however, the solidified ink was very easily scratched form the surface with the fingernail: this is a major shortcoming of the wax based inks. Specially coated substrates are marketed by several companies which essentially provide a humpy surface to produce mechanical adhesion.

The embossed substrates exhibited a remarkable improvement in abrasion resistance, with no loss of color density. Particularly in the case of both the filled and unfilled 7C50 material resistance to fingernail scratching was almost complete; only the hardest finger pressure resulted in scratching of the ink from the surface.

Example 7

Solvent Inks

Using the Epson Stylus 500 with solvent based inks, several microembossed vinyl film samples were printed along with control plain cast vinyl film. None of the films had a receptor coat. The inks contain moderately volatile solvents. Prints on plain vinyl film came out of the printer looking and feeling wet, where the solvent has not yet evaporated. These prints remained wet for about 2 minutes leaving the printer. On the other hand, embossed vinyl films with PYR1 or CCP structures when printed under the same conditions, came out of the printer looking and feeling dry to the touch.

Example 8

UV Curable Inks

Using an MIT printhead (Modular Ink Technology, Jarfalla, Sweden) mounted on an x-y plotter set-up, 100% UV curable inks were printed on plain and microembossed films made of extruded vinyl, ethylene propylene copolymer, PETG, EVA1, and Affinity. A pattern of lines was printed on all these samples. Prior to UV curing, smearing and blotting of the printed lines were tested using cotton tipped applicator, where the cotton tip was rubbed across the print, and smearing of lines along with ink transfer to the cotton tip was evaluated. All plain film, exhibited severe smearing where the printed lines completely rubbed off the surface of the film transferring all the ink to the cotton tip. All microembossed films did not show any smearing (as long as the microembossed volume is large enough to hold one ink drop). Patterns such as CCP where area at the surface of the film is minimized, did not transfer any ink to the cotton tip, while patterns with significant area at the film surface such as cubes, resulted in small amount of ink transfer to the cotton tip. When cured, both plain and microembossed printed films appeared qualitatively similar in terms of speed of cure, total energy required to cure, and quality of cured image.

Figure 7A:
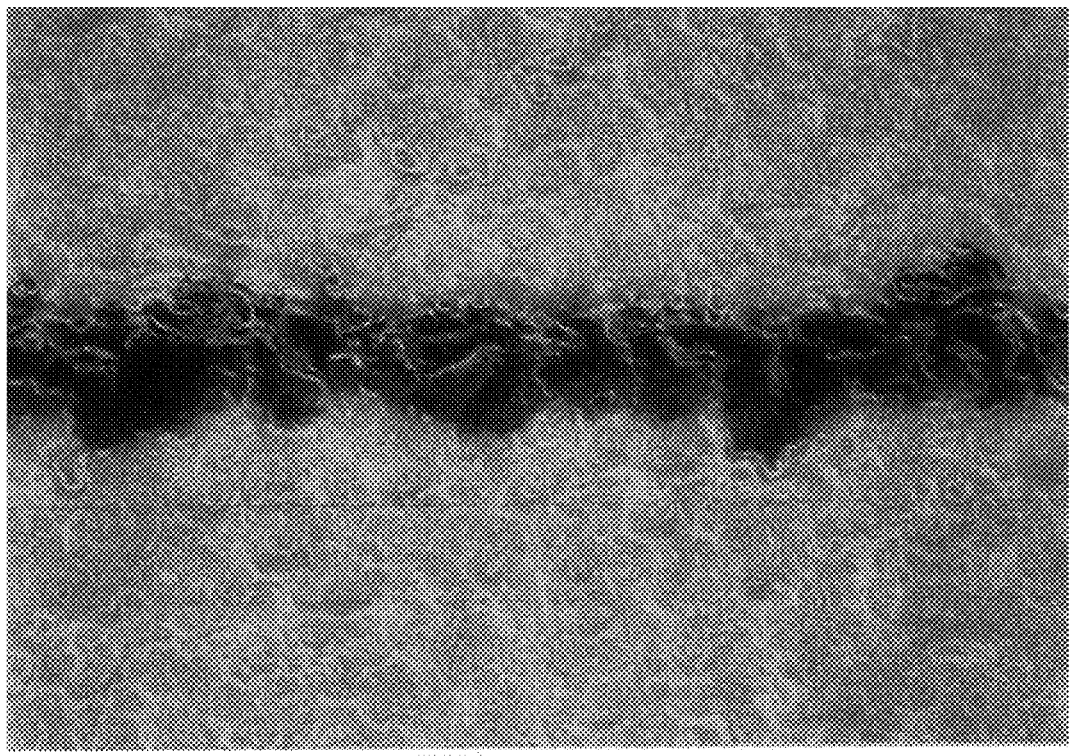
FIG. 7 shows 133X photomicrographs of an imaged media of the present invention with FIG. 7a showing a printed line on control media and FIG. 7b showing the same line with the same printing conditions on media of the present invention.
Figure 7B:
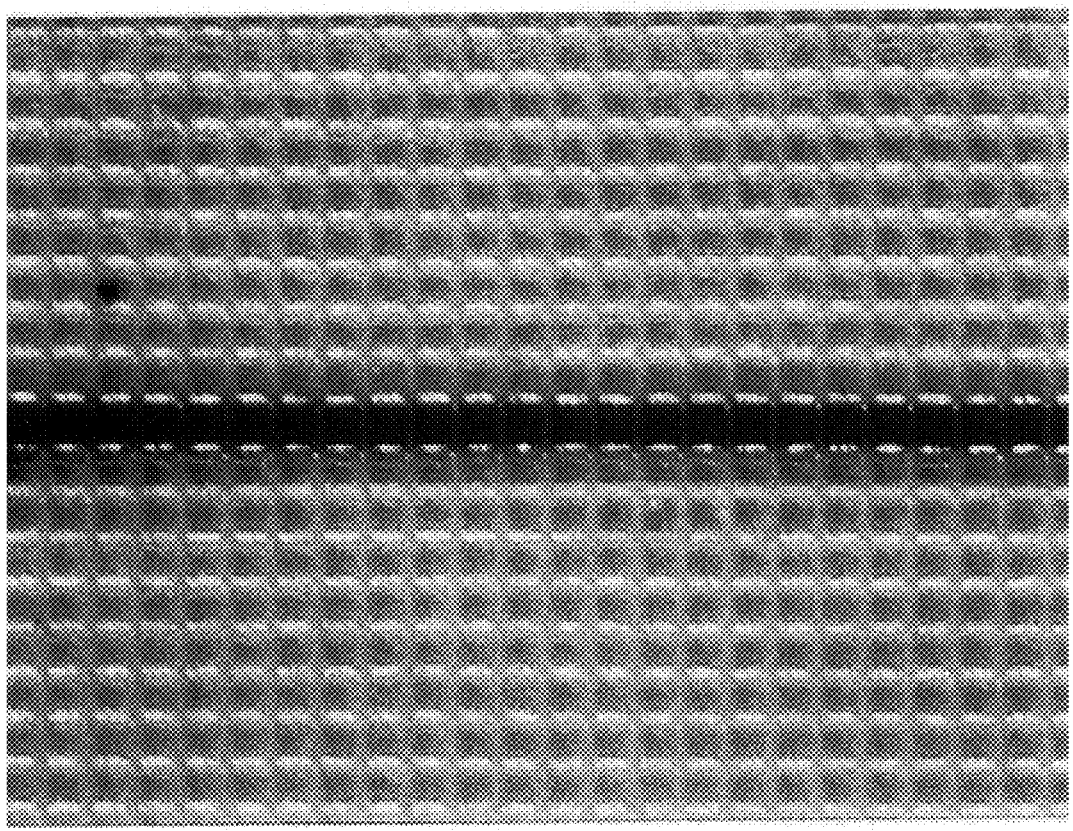

FIGS. 7a and 7b shows micrographs of lines printed on plain extruded vinyl film and microembossed vinyl film. The microembossed structure RECT is optimized For the MIT printhead that produces 40 micron drops at 360 dpi resolution. FIG. 7a shows that on plain vinyl film, the lines are 120–150 (over 300% dot gain) microns in width (this is the same line width seen on cast vinyl film also). The microembossed film gives line width of 50 microns (25% dot gain), the same width as the microembossed structure. This example shows that microreplication call provide precise control of dot gain.

Example 9

The RECT pattern was embossed by hot press into a coextruded film of poly(ethylene terephthalate) (PET) and Eastar 6763. The film was biaxially oriented 2×2 prior to embossing. The total thickness of the oriented film was 50 microns, of which the Eastar 6763 layer was about 21 microns. The temperature of the press was not higher than 165° C., which is insufficient to relax the biaxially oriented PET layer. This film was used without further modification by topical coating, etc.

The patterned sheet was subjected to a print test in an HP 855Cse desktop inkjet printer. As a control, 3M's CG3460 overhead transparency product was printed with the same test pattern. In both cases, the print mode chosen was "normal"/"paper". This print mode instructs the printer to print at the highest possible speed.

Figure 8A:
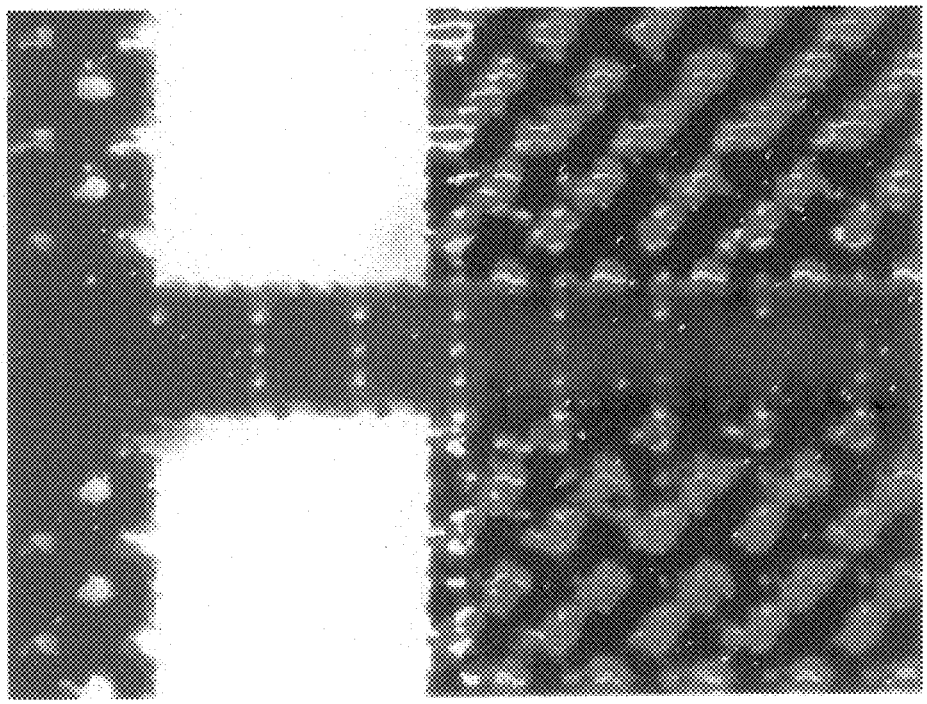
FIG. 8 shows portion of a test print of media of the present invention, magnified 33X, with FIG. 8a showing the print generated on control media with FIG. 8b showing the same print on the same media after microembossing according to the present invention.
Figure 8B:
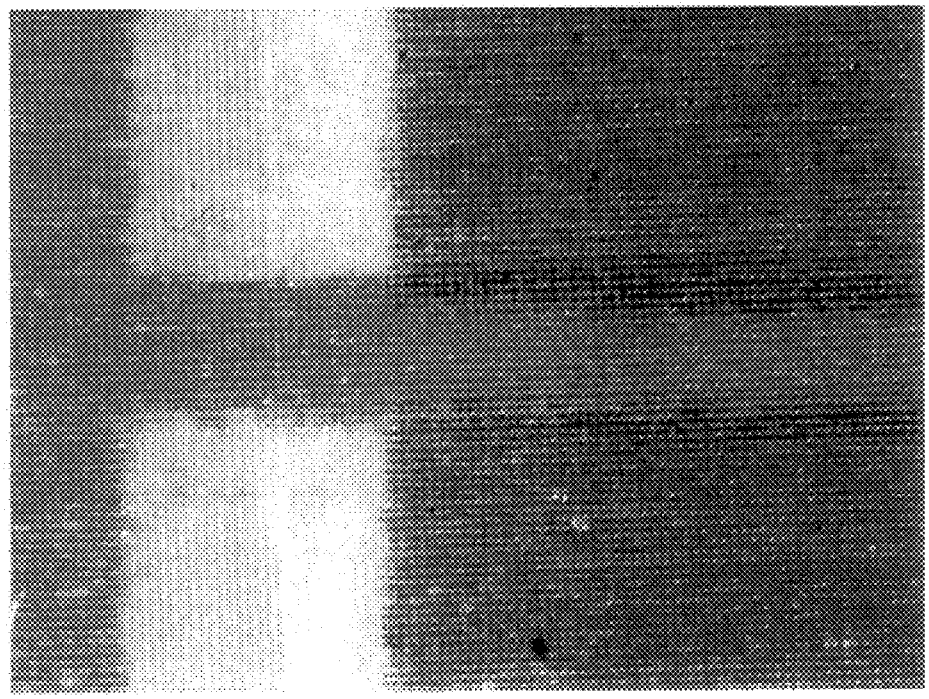

The printed samples showed the failure of the CG3460 to take up the ink sufficiently to make a good quality print using this print mode. FIG. 8 shows 33X micrographs of one area of the print test pattern, to illustrate the difference s between the ink uptake mechanism of the two films. FIG. 8a shows the intersection of a red line with a blue solid area printed on the CG3460 film. FIG. 8b shows the corresponding area of the microembossed sheet. Poor print quality due to ink heading is apparent in FIG. 8a: ink heading is presumably caused by the fast print speed. Good quality prints can be obtained on CG3460 by using the "transparency" print mode. Ink heading is not apparent in FIG. 8b, and the uncoated embossed sample shows good line width control and resolution of the test pattern.

Figure 9A:
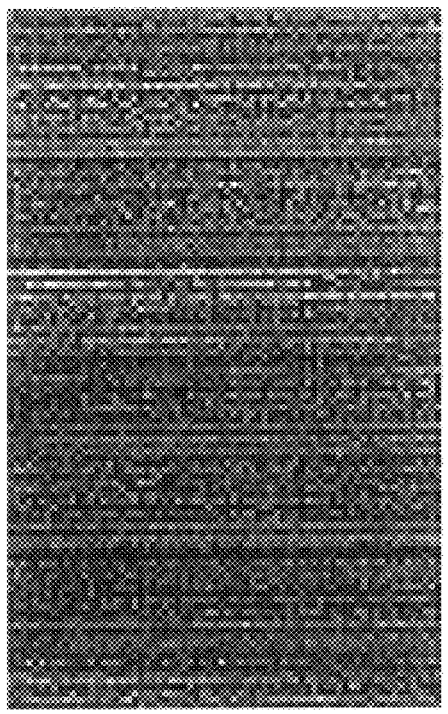
Figure 9B:
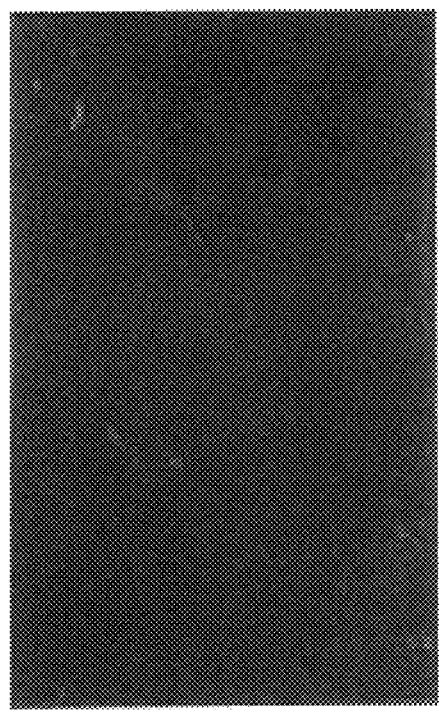
FIG. 9b shows the same print on media of the present invention.

FIG. 9 further shows the benefits of microembossing in the same print. FIG. 9a shows solid black printed block on the CG3460 sample without magnification; 9b shows the corresponding area on the RECT embossed sample. The black print area formed by the pigmented ink in the Hewlett Packard DeskJet 855Cse was observed to undergo severe mudcracking in the fast print mode when printed on CG3460. There was a complete absence of mudcracking in the corresponding microembossed sample; black areas look continuous, dense, and sharp. Also, handing patterns, which were apparent in the black and colored areas of the CG3460 sample (again presumably due to the fast printing), were absent in the microembossed sample.

The invention is not limited to the above embodiments. The claims follow.

What is claimed is:

1. A method of producing an image, comprising the step of printing a jettable ink through an inkjet printing head onto a receptor medium comprising a sheet having an engineered embossed surface as one major surface thereof, the engineered embossed surface comprising a plurality of elements in a repeating pattern wherein the sheet is nonporous and wherein each element of the engineered embossed surface has a capacity of from about 20 pL to about 1,000 pL.

2. The method of claim 1, wherein the embossed surface comprises cavities.

3. The method of claim 2, wherein cavities are completely enclosed by walls on all sides and packed closely together such that (1) thickness of the wall tops is 10 $\mu$m or less, (2) cavity volume is commensurate with 100 to 300% ink, and (3) the number of cavities per inch is equal to or greater than the number of dots per inch (dpi) of a targeted printer.

4. The method of claim 2, wherein the volume of a cavity can range from about 60 to about 600 pL.

5. The method of claim 2, wherein aspect ratio of a cavity can range from about 0.3 to about 2.

6. The method of claim 2, wherein aspect ratio of a cavity can range from about 0.5 to about 1.

7. The method of claim 2, wherein one cavity is cubic-shaped and has a depth ranging from about 25 to about 75 $\mu$m and wherein walls between cavities are at about 0° tilt from normal.

8. The method of claim 2, wherein one cavity is hemispherical and has a depth ranging from about 35 to about 70 $\mu$m.

9. The method of claim 2, wherein the pattern comprises cube corner prism, cube, pyramid, truncated pyramid, or hemi-ellipse.

10. The method of claim 1, wherein the embossed surface comprises a pattern of posts.

11. The method of claim 10, wherein the pattern of posts protrudes from the surface of the sheet.

12. The method of claim 1, wherein the embossed surface has a topography to protect material from abrasion from items contacting the embossed surface, that on a macroscopic level, constitute the outermost surface of the medium.

13. The method of claim 1, wherein the sheet is transparent, translucent, opaque, clear, tinted, optically transmissive, optically reflective, or optically retroreflective.

14. The method of claim 1, wherein the sheet is a polymeric film selected from the group consisting of polyolefins, poly(vinyl chloride), copolymers of ethylene with vinyl acetate or vinyl alcohol, copolymers and terpolymers of hexafluoropropylene and surface modified versions thereof, poly(ethylene terephthalate) and copolymers thereof, polyurethanes, polyimides, acrylics, and filled versions thereof, wherein the filled versions employ fillers selected from the group consisting of silicates, aluminates, feldspar, talc, calcium carbonate, and titanium dioxide.

15. The method of claim 1, wherein the jettable material is a pigmented inkjet ink.

16. A method of producing an image. comprising the step of printing a jettable material through an inkjet printing head onto a receptor medium comprising a sheet having an engineered embossed surface as one major surface thereof, the engineered embossed surface comprising a plurality of elements in a repeating pattern wherein the sheet is nonporous, wherein the jettable material selected from the group consisting of biological fluids, pharmaceuticals, chemical assay reagents, and combinations thereof, and wherein each element of the engineered embossed surface has a capacity of from about 20 pL to about 1,000 pL.

* * * * *

UNITED STATES PATENT AND TRADEMARK OFFICE
CERTIFICATE OF CORRECTION

PATENT NO.   : 6,386,699 B1
DATED        : May 14, 2002
INVENTOR(S)  : Ylitalo, Caroline M.

It is certified that error appears in the above-identified patent and that said Letters Patent is hereby corrected as shown below:

Column 1,
Line 40, delete "Design" and insert in the place thereof -- Designjet --.
Line 64, delete "conic" and insert in place thereof -- come --.

Column 2,
Line 16, delete "the ink and most" and insert in place thereof -- the ink and receptor medium is most --.
Line 67, delete "can the" and insert in place thereof -- can be --.

Column 3,
Line 18, delete "reels" and insert in place thereof -- feels --.
Line 28, delete "(it" and insert in place thereof -- (a --.

Column 4,
Line 22, delete "carrier. solvents" and insert in place thereof -- carrier solvents --.
Line 29, delete "unexpectedly solve" and insert in place thereof -- unexpectedly solves --.
Line 63, delete "having in" and insert in place thereof -- having an --.

Column 5,
Line 6, delete "making all" and insert in place thereof -- making an --.
Line 8, delete "ail embossing" and insert in place thereof -- an embossing --.
Line 39, delete "is handing," and insert in place thereof -- as banding, --.

Column 6,
Line 22, delete "(hereon," and insert in place thereof -- thereon, --.
Line 64, delete "sees ail" and insert in place thereof -- sees an --.

Column 10,
Line 26, delete "by referenced" and insert in place thereof -- by reference --.
Line 67, delete "$6.9 \times 10^5$ to about $1.0 \times 10^4$ kPa" and insert in place thereof -- $6.9 \times 10^4$ to about $1.0 \times 10^5$ kPa --.

Column 11,
Line 11, delete "through nip" and insert in place thereof -- through a nip --
Line 19, delete "file extruder" and file insert in place thereof -- the extruder --.
Line 29, delete "40to" and insert in place thereof -- 40 to --.

UNITED STATES PATENT AND TRADEMARK OFFICE
CERTIFICATE OF CORRECTION

PATENT NO.     : 6,386,699 B1
DATED          : May 14, 2002
INVENTOR(S)    : Ylitalo, Caroline M.

It is certified that error appears in the above-identified patent and that said Letters Patent is hereby corrected as shown below:

Column 11,
Line 30, delete "Speed" and insert in the place thereof -- speed --.
Line 53, delete 'ink. Formulations" and insert in place thereof
-- ink formulations --.

Column 13,
Line 5, delete "call be" and insert in place thereof -- can be --.

Column 14,
Line 3, delete "lest pattern," and insert in place thereof -- test pattern, --.
Line 23, delete "print lest" and insert in place thereof -- print test --.

Column 17,
Line 6, delete "file ink" and insert in place thereof -- the ink --.
Line 28, delete "Structure" and insert in place thereof -- structure --.

Column 18,
Line 53, delete "difference s" and insert in place thereof -- difference --.
Line 58, delete "ink heading" and insert in place thereof -- ink beading --.

Signed and Sealed this

First Day of June, 2004

JON W. DUDAS
*Acting Director of the United States Patent and Trademark Office*